(12) United States Patent
Szpendyk

(10) Patent No.: US 10,371,188 B2
(45) Date of Patent: Aug. 6, 2019

(54) WALL MOUNTED HANGING PLANT HOLDER

(71) Applicant: Anton Szpendyk, Royal Palm Beach, FL (US)

(72) Inventor: Anton Szpendyk, Royal Palm Beach, FL (US)

( * ) Notice: Subject to any disclaimer, the term of this patent is extended or adjusted under 35 U.S.C. 154(b) by 165 days.

(21) Appl. No.: 15/432,922

(22) Filed: Feb. 15, 2017

(65) Prior Publication Data
US 2017/0251609 A1 Sep. 7, 2017

Related U.S. Application Data

(60) Provisional application No. 62/296,162, filed on Feb. 17, 2016.

(51) Int. Cl.
A47G 7/04 (2006.01)
F16B 13/04 (2006.01)

(52) U.S. Cl.
CPC .............. *F16B 13/04* (2013.01); *A47G 7/044* (2013.01)

(58) Field of Classification Search
CPC . A47G 7/044; A47G 7/04; A47G 7/02; A47G 7/045; A01G 9/00; A01G 9/02; A01G 9/024
See application file for complete search history.

(56) References Cited

U.S. PATENT DOCUMENTS

| | | | |
|---|---|---|---|
| 4,839,792 A | 6/1989 | Reed | |
| D339,942 S * | 10/1993 | Emalfarb | D6/513 |
| 5,390,443 A * | 2/1995 | Emalfarb | A47G 7/044 211/119 |
| 5,711,502 A * | 1/1998 | Emalfarb | A47G 7/044 248/302 |
| D405,289 S * | 2/1999 | Rosenberg | D6/403 |
| 6,027,083 A * | 2/2000 | Chang | A47G 7/044 248/153 |
| D433,958 S * | 11/2000 | Rosenberg | D6/513 |
| 6,439,522 B1 * | 8/2002 | Yeh | A47B 96/061 248/228.6 |
| 6,539,665 B1 | 4/2003 | Llona | |
| 6,672,003 B2 | 1/2004 | Park | |
| 6,971,204 B1 | 12/2005 | Gibney | |
| 8,360,381 B2 * | 1/2013 | Lee | F16M 13/022 211/106.01 |
| 9,179,607 B2 * | 11/2015 | Berio | A01G 9/02 |
| 2006/0219853 A1 | 10/2006 | Molina, Jr. et al. | |

(Continued)

FOREIGN PATENT DOCUMENTS

| | | | | |
|---|---|---|---|---|
| FR | 1239180 A | * | 8/1960 | ............. A47G 7/044 |
| FR | 2796540 A1 | * | 1/2001 | ............. A47G 7/044 |

*Primary Examiner* — Kristen C Hayes
(74) *Attorney, Agent, or Firm* — Allen F. Bennett; Bennett Intellectual Property

(57) ABSTRACT

A plant holder has a basket formed from a base and a peripheral sidewall around the base. A support arm extends upward from the base at a flat region of the sidewall. A hook at the distal end of the support arm may be inserted into a hole in a vertical surface such as a wall. The basket is then suspended from the support arm and the flat region of the sidewall abuts and is flush with the vertical surface. The support arm may be angled slightly inward toward the center of the basket in order to provide additional force holding the plant holder against the vertical surface it is suspended from.

3 Claims, 4 Drawing Sheets

(56) References Cited

U.S. PATENT DOCUMENTS

| | | | |
|---|---|---|---|
| 2009/0250415 A1 | 10/2009 | Sellers et al. | |
| 2012/0049032 A1* | 3/2012 | Lee | A47G 7/044 248/323 |
| 2013/0264443 A1 | 10/2013 | Armas | |
| 2015/0136923 A1* | 5/2015 | Berio | A01G 9/02 248/219.2 |
| 2016/0295808 A1 | 10/2016 | Ou | |

* cited by examiner

WALL MOUNTED HANGING PLANT HOLDER

CROSS-REFERENCE TO RELATED APPLICATIONS

This application claims priority to U.S. Provisional Application Ser. No. 62/296,162 filed on Feb. 17, 2016, the contents of which are hereby incorporated in their entirety.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable

REFERENCE TO SEQUENCE LISTING, A TABLE, OR A COMPUTER PROGRAM LISTING APPENDIX SUBMITTED ON A COMPACT DISC AND INCORPORATION-BY-REFERENCE OF THE MATERIAL

Not Applicable.

BACKGROUND OF THE INVENTION

Field of Endeavor:

The present invention relates to devices, systems and methods for a plant holder mountable on a vertical surface. More particularly, the invention relates to a plant holder extending substantially perpendicularly from a vertical surface and affixed thereto by a removable hook on a support arm.

Background Information:

Outdoor decks and stairways are desirable locations for potted plants, because they are exposed to ample sunlight, air and rain. Potted plants also help to make outdoor decks and stairways more attractive. Balusters, walls, posts and other vertical surfaces of a deck or stairway afford ideal locations for potted plants, provided there is a suitable means for supporting the pots.

Preferably plant holders support a flower pot in an upright position without the need for the pot to be equipped with its own hook or hanger. Hanging flower pots are typically designed to hang from a ceiling, but not a vertical surface such as a wall, post or baluster. The ability to hang plants in ordinary pots gives the homeowner more options in terms of rotating different plants in various locations—for aesthetic variety and to adjust for seasonal changes in sunlight.

Various plant holders have been provided for attaching to a baluster or other vertical surface. However, these often require bulky devices that wrap around the baluster and are overly complicated. The only other alternative is to hang a plant from a ceiling or eave.

In view of the foregoing, there is a need to provide devices and methods for displaying and retaining a potted plant on a vertical surface.

BRIEF SUMMARY OF THE INVENTION

Accordingly, the primary object of the present invention is to provide a plant holder that may be suspended on a vertical surface requiring a minimal amount of interaction with that vertical surface In addition, the invention provides a plant holder stabilized against a vertical surface from which it is suspended.

In greater detail, a plant holder comprises a basket having a base including a horizontal surface. A sidewall extends about the periphery of the base. The sidewall includes a flat wall abutting region on one side of the basket. A support arm extends upward from the basket and has a proximal end attached to the tray at the flat wall abutting region. A hook is positioned at a distal end of the support arm and adapted to engage a hole in a vertical surface. The flat surface abutting region of the basket from which the support arm extends is substantially flat and lies flush against a vertical surface to which the plant holder is engaged by means of the hook positioned at the upper region of the support arm. The basket is substantially perpendicular to the vertical surface.

The plant holder may have a sidewall that tapers outward from the base. The support arm may also form an obtuse angle with the basket.

It is therefore an object of the present invention to provide a plant holder that may be suspended from a vertical surface requiring a minimal amount of interaction with the vertical surface and having a stable basket.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
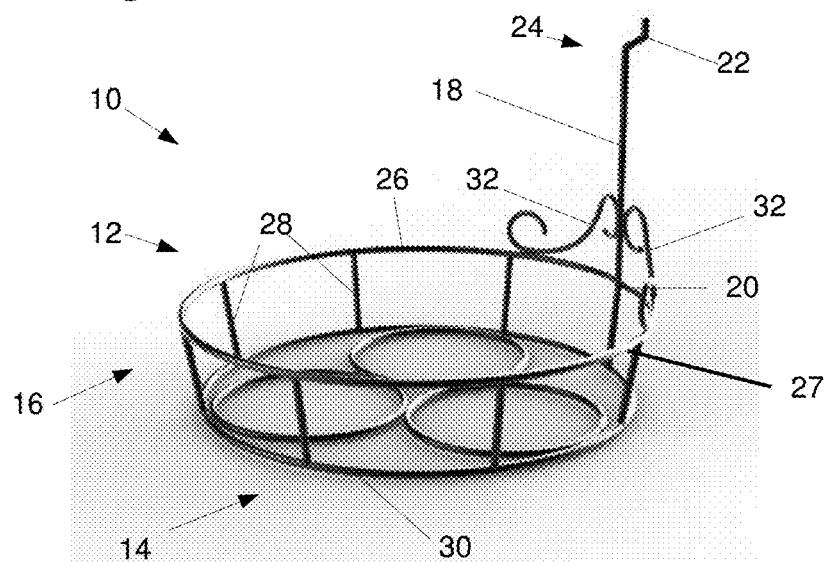
FIG. 1 is a perspective view of a plant holder in accordance with the principles of the invention.

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The following detailed description is merely exemplary in nature and is not intended to limit the described embodiments or the application and uses of the described embodiments. All of the implementations described below are exemplary implementations provided to enable persons skilled in the art to make or use the embodiments of the disclosure and are not intended to limit the scope of the disclosure, which is defined by the claims.

For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Disclosed is a plant holder designed to rest against a vertical surface using minimal components and requiring a minimal amount of surface for attachment. The plant holder may include a basket having a flat surface abutting against a wall to which it is attached. A support arm extends upward and has a hook that may be inserted into a hole in a vertical surface to which the plant holder is attached. The flat surface abutting region of the basket lies flush against the vertical surface. The support arm may be angled slightly inward toward the center of the basket. When the plant holder is suspended against a vertical surface, the angle between the support arm and the basket results in an increased force pushing the plant holder against a vertical surface. This additional force assists and stabilizing the plant holder in a desired location.

FIGS. 1-4 show a wall mounted plant holder 10 in accordance with the principles of the invention. The wall mounted plant holder 10 includes a basket 12 having a planar horizontal base 14 and a peripheral sidewall 16. In this embodiment, the base 14 is formed from a series of curved wires or rods and the peripheral sidewall includes a peripheral circular wire 30. As a result, the base 14 and sidewall are air and water permeable. The peripheral sidewall 16 is formed from a circular rail 26 having a slightly larger diameter than the circular metal wire 30 of the base 14. A plurality of wire posts 28 extend upward from the peripheral circular rail 30 to the sidewalls circular rail 26. The base 14 and the sidewall 16 may optionally be comprised of solid material.

The basket 12 also has a flattened stabilizing element 20 incorporated into the peripheral wall 26 as a linear section of the circular rail 26. A support arm 18 is attached to the basket 12 that extends upward from the stabilizing element 20 and extends upward to a sigmoidal hook 22 located at the distal end 24 of the support arm 18. In this embodiment, the stabilizing element 20 is a straight or flat region of the sidewall's circular rail 26 that extends between a first end 21 and a second end 23 and substantially perpendicular to the support arm 18.

Figure 2:
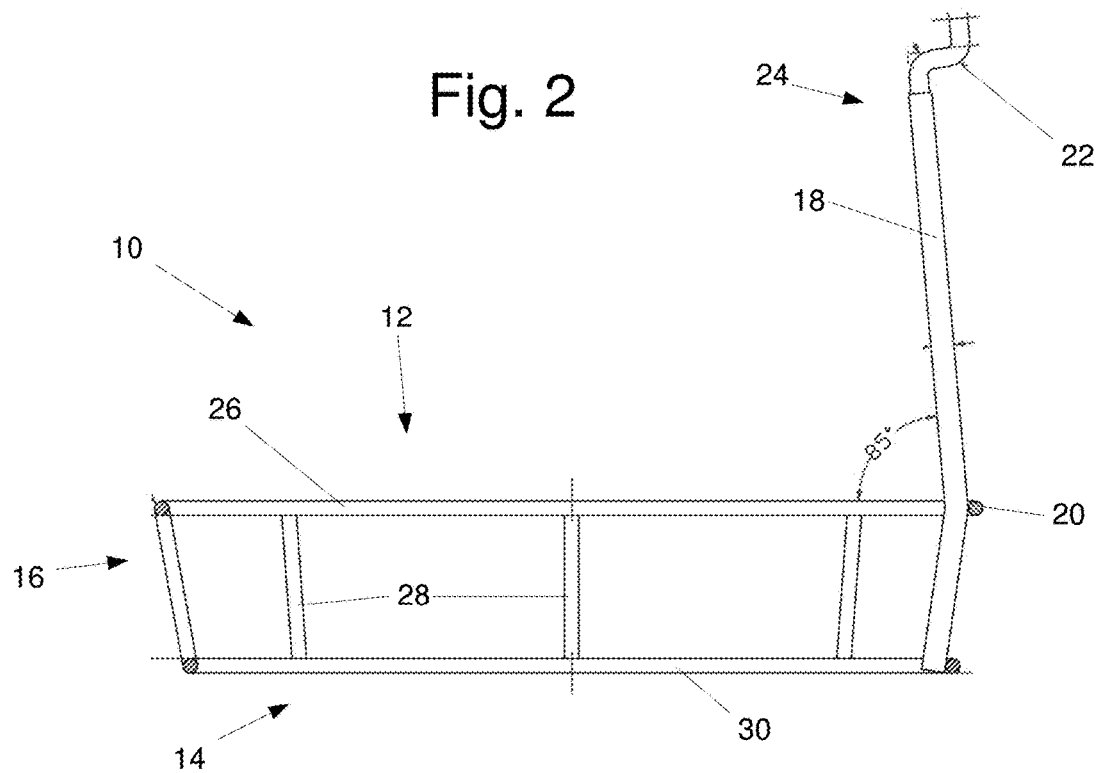
FIG. 2 is a side view of a plant holder in accordance with the principles of the invention.

The support arm 18 may extend upward from the flattened wall abutting region 20 and may bend inward toward the center of the basket 12. In this embodiment, as shown in FIG. 2, the support arm may form acute angle with the rim 27, defined by the circular rail 26. In this embodiment, the support arm 18 forms and 85° angle with the horizontal components of the basket 12. Two struts 32 may buttress the support arm 18 and extend from the support arm 18 to the side wall 26. In this embodiment, the struts 32 have a stylized, curved design for as aesthetic purposes. The sigmoidal hook 22 located at the distal end 24 of the support arm 18 may be configured to engage a hole in a vertical surface and a manner similar to that of a peg on a common pegboard.

Figure 3:
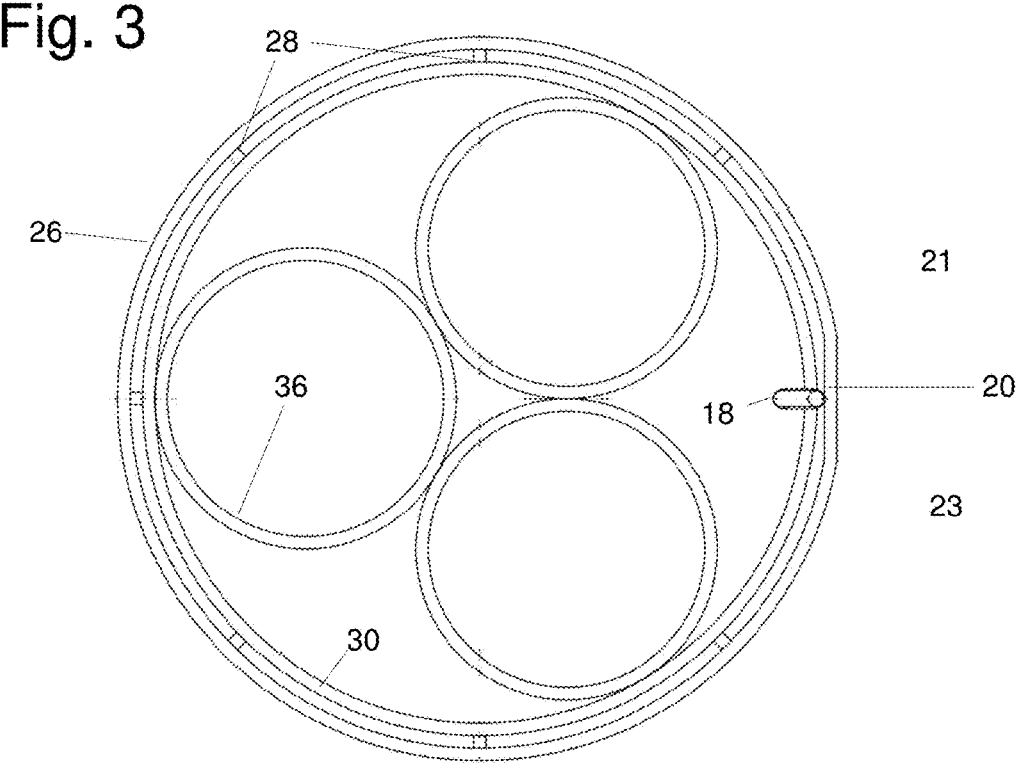
FIG. 3 is a top plan view of a plant holder in accordance with the principles of the invention.
Figure 4:
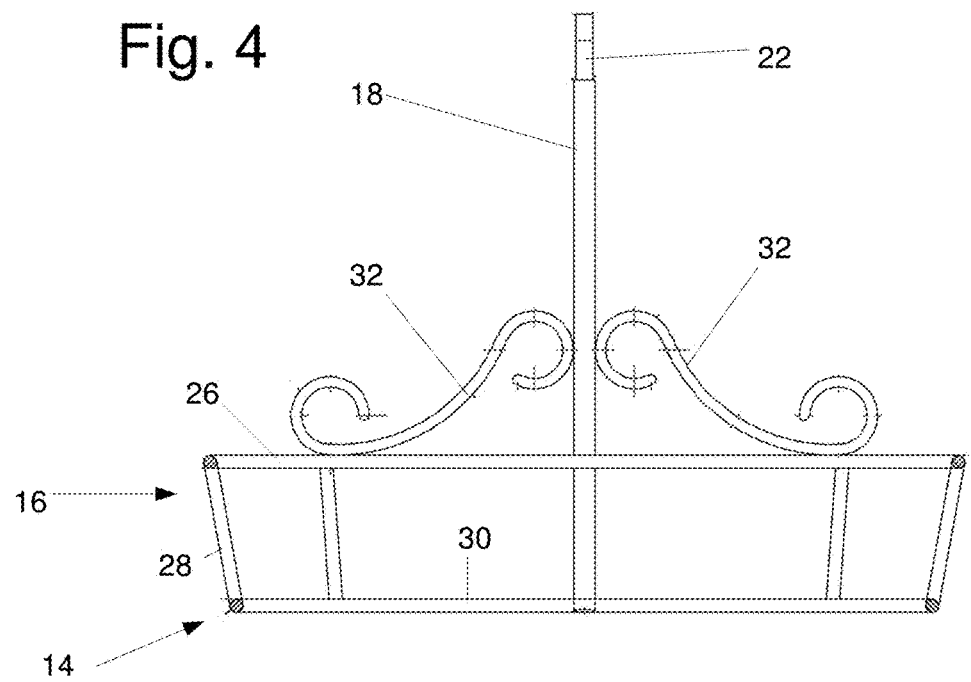
FIG. 4 is a rear view of a plant holder in accordance with the principles of the invention.

FIG. 3 shows a top plan view of the plant holder 10. Here it may be seen that the flattened stabilizing element 20 is a relatively small portion of the basket 10. In this embodiment, three rings 36 attached to the circular wire 30 form the base 14. Optionally, the base 14 may be used to hold more than one plant. For example, three inverse frustoconical pots may be placed in each of the three rings 36.

In use, the plant holder 10 of the present invention may be suspended on a vertical wall by inserting the sigmoidal hook 22 into a hole in the wall. The plant holder 10 may be attached to a typical peg board or to a wall in which a hole has been created to accommodate the hook 22. The flattened wall abutting region 20 of the basket 12 may lie flush against a wall the plant holder 10 is suspended on. The stabilizing element 20 and the hook 22 provide three contact points for the plant holder 10, thus defining a vertical plane that lies flush against the vertical surface from which it hangs. This stabilizes the plant holder 10 in position and prevents wobbling. Because the support arm 18 is attached to the basket 12 at a slightly obtuse angle, the action of gravity on the weight of a plant or other object placed in the basket 12 creates a force in the basket in the direction of the wall from which it is hanging. Optionally, the stabilizing element 20 may include a pad or coating of rubber or similar material to increased static friction between the basket 12 and a wall.

Figure 5:
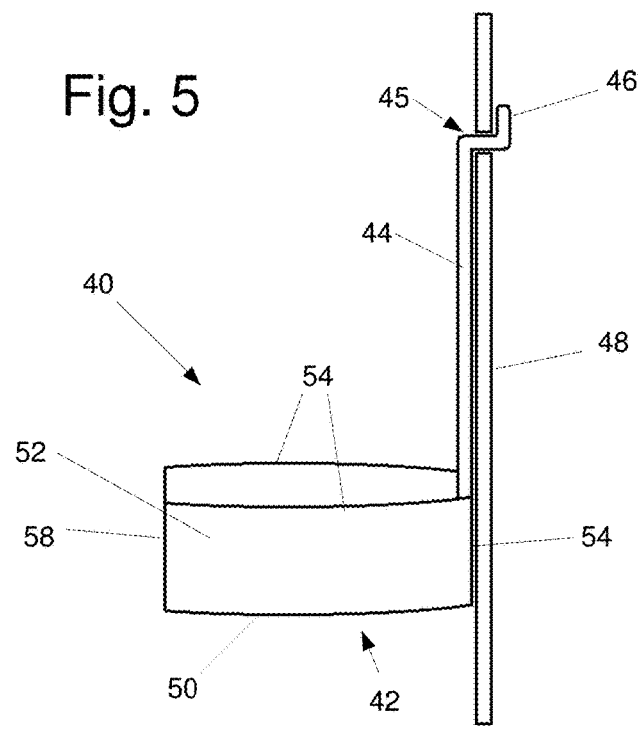
FIG. 5 is a side view of an alternative embodiment of a plant holder in accordance with the principles of the invention.

FIG. 5 shows an alternative embodiment of a suspended plant holder 40 in accordance with the principles of the invention. The plant holder 40 includes a basket 42 and a support arm 44. The basket includes a base 50 and a sidewall 52. In this embodiment, the basket includes two curved sides 56 and a flat front 58. The sidewall 52 in this embodiment is solid and includes a flattened wall abutting region 54. The plant holder 40 may be suspended on a wall 48 having a hole 45. A sigmoidal hook 46 extends through the hole 45, thereby suspending the plant holder 40 from the wall 48. The flattened wall abutting region 54 in conjunction with the hook 46, holds the plant holder 40 in a stable position along the wall.

Figure 6:
FIG. 6 is an environmental perspective view of a plant holder in accordance with the principles of the invention.
Figure 7:
FIG. 7 is another environmental perspective view of a plant holder in accordance with the principles of the invention.

FIGS. 6 and 7 show the first embodiment of a plant holder 10 affixed to vertical posts. The plant holder 10 may be positioned on any vertical surface. It does not require a post because it does not include components that wrap around an object. Because only a relatively small flattened wall abutting surface and a small peg hook are used to suspend the plant holder, a large worldwide wall is not necessary. The plant holder of the invention may be used on almost any vertical surface. Optionally, the plant holder may be used on a sloped surface. If the plant holder has a basket formed from metal wire, it may be used outside and require little or no cleaning or maintenance.

Figure 8:
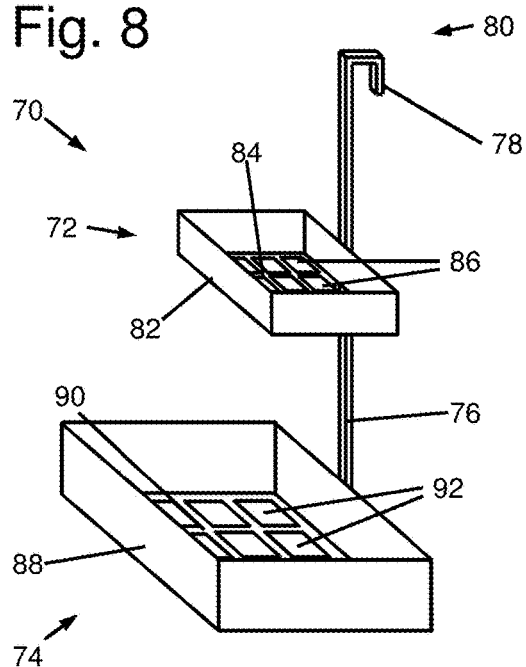
FIG. 8 is a perspective view of an alternative embodiment of a plant holder in accordance with the principles of the invention.

FIG. 8 shows an alternative embodiment of a wall-mounted hanging plant holder 70. In this embodiment, the invention includes two baskets 72 and 74, thereby providing a tiered plant holder. Both of the upper basket 72 and lower basket 74 are affixed to a vertical support arm 76 having a hook 78 at the upper end 80 of the support arm. In this embodiment, the hook 78 is angular, not curved. Upper basket 72 is rectangular and has a rectangular sidewall 82 and a rectangular base 84. The base 84 includes a plurality of rectangular openings 86 such that the base 84 has a gridlike configuration. Similarly, lower basket 74 is rectangular, having a rectangular sidewall 88 and a base 90 having a plurality of rectangular openings 92. The rectangular sidewalls 82 and 88 are solid and continuous. However, the sidewalls 82 and 88 may be constructed using material that is air and/or water permeable.

Figure 9:
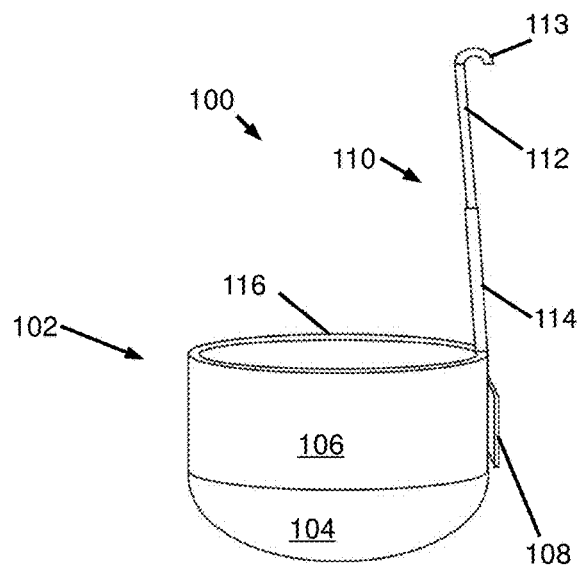
FIG. 9 is a perspective view of another alternative embodiment of a plant holder in accordance with the principles of the invention.

FIG. 9 shows another alternative embodiment of a wall-mounted hanging plant holder 100. Plant holder 100 has a basket 102 having a base 104 and a sidewall 106. In this embodiment, the base 104 has a hemispherical shape and is not planar. A stabilizing element 108 is a flat plate affixed to the sidewall 106 and centered about a vertical support arm 110.

The vertical support arm 110 has two telescoping rods 112 and 114. By pulling rod 112 out of rod 114 or pushing rod 112 into rod 114 allows an operator to adjust the length of the vertical support arm 110. The upper end of the vertical support arm 110 has an arcuate hook 113 that may be inserted into a hole on a wall, post or other vertical surface. The vertical support arm 110 forms an acute angle with rim 116. Generally, the acute angle formed by the support arm 110 and the rim 116 is between 70° and 90°.

Figure 10:
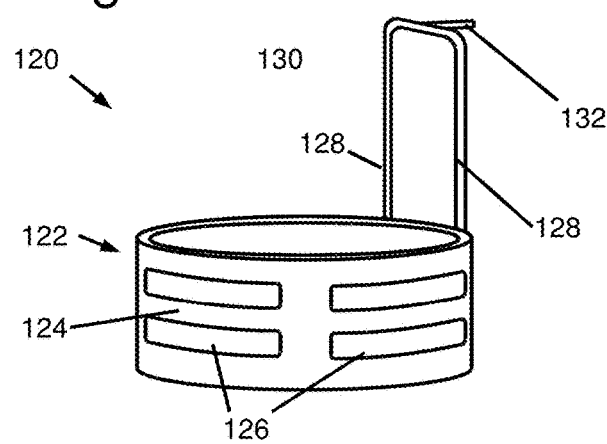
FIG. 10 is a perspective view of another alternative embodiment of a plant holder in accordance with principles of the invention.

FIG. 10 shows another alternative embodiment of a wall-mounted hanging plant holder 120. The plant holder 120 has a basket 122 having a peripheral wall 124 and a planar base, not shown. The peripheral wall 124 includes a plurality of openings 126. In this embodiment, a vertical support arm includes two separate support arms 128 that join at the upper end 130 of the support arms. A straight hook 132 extends away from the basket 122 horizontally from the upper end 130 of the support arms 128.

Whereas, the present invention has been described in relation to the drawings attached hereto, it should be understood that other and further modifications, apart from those shown or suggested herein, may be made within the spirit and scope of this invention. Descriptions of the embodiments shown in the drawings should not be construed as limiting or defining the ordinary and plain meanings of the terms of the claims unless such is explicitly indicated.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A plant holder comprising:
a basket having a planar base and a rim defined by a peripheral sidewall;
a flattened stabilizing element on the rim of the basket; and,
a vertical support arm having a retention hook at an upper end and attached to the basket at a lower end, the vertical support arm extending upward from the stabilizing element at an acute angle to the rim;
wherein the base is defined by a plurality of curved wires.

2. The plant holder of claim 1 wherein the peripheral wall consists of a circular rail having a diameter greater than a diameter of the base and a plurality of wire posts extending upward from the base.

3. The plant holder of claim 1 wherein the stabilizing element is a flattened region of the sidewall.

* * * * *